(12) United States Patent
Collier et al.

(10) Patent No.: US 7,199,895 B2
(45) Date of Patent: Apr. 3, 2007

(54) PROCESSING A PRINTER CONTROL COMMAND

(75) Inventors: Dan L. Collier, Ridgefield, WA (US); Jeremy Bunn, Kelso, WA (US); Charles Newby, Camas, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 771 days.

(21) Appl. No.: 10/349,640

(22) Filed: Jan. 23, 2003

(65) Prior Publication Data

US 2004/0145769 A1 Jul. 29, 2004

(51) Int. Cl.
G06F 3/12 (2006.01)
G06K 15/00 (2006.01)

(52) U.S. Cl. .............. 358/1.15; 358/1.13; 358/1.14

(58) Field of Classification Search ........ 358/1.1–1.18; 709/223, 224, 228–232; 710/1–8, 19–21, 710/31–47
See application file for complete search history.

(56) References Cited

U.S. PATENT DOCUMENTS 6,067,558 A * 5/2000 Wendt et al. ............... 709/202
6,308,205 B1 * 10/2001 Carcerano et al. .......... 709/221
7,025,209 B2 * 4/2006 Hawkins ..................... 209/217

FOREIGN PATENT DOCUMENTS

| EP | 0867817 A2 | 9/1998 |
| EP | 1143695 A2 | 10/2001 |
| EP | 1271299 A2 | 1/2003 |

OTHER PUBLICATIONS

"The ZebraLink Solution", Zebra Technologies, 2002. Online at: http://www.zebra.com/whitepapers/11314, retrieved Jan. 4, 2005.
European Search Report for Application No. EP03020335, filed Sep. 9, 2003. Report prepared/completed Jan. 7, 2005.

* cited by examiner

Primary Examiner—Douglas Q. Tran (57) ABSTRACT

In one embodiment, a method for processing a printer-control command includes identifying when an encoded uniform-resource-locator-based printer-control command is received, decoding the encoded uniform-resource locator to identify a printer function, and performing the printer function.

12 Claims, 10 Drawing Sheets

PROCESSING A PRINTER CONTROL COMMAND

BACKGROUND

Portable devices that link users to communication services are popular and widespread. Personal digital-assistants (PDAs) include pocket-personal computers with a range of computing capabilities. Cellular telephones are commercially available with more and more functionality that until recently has been provided by computing devices interconnected using wired communication links. For example, cellular telephone service providers now provide email services, paging, and a host of other information services.

One of the driving forces behind the popularity of mobile-communication devices is the ability to interact with devices coupled to the Internet and other networks from anywhere within the reach of a wireless-communication service provider. Wireless-communication links allow the operator of a mobile-computing device and/or a mobile-communication device to access data and devices coupled to networks accessible through the wireless-communication service provider. For example, a cellular telephone user can access information via the Internet or a laptop computer user can locate, access, and retrieve files from a remote office LAN, in addition to accessing the Internet.

The Internet is a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data packets from node to node across the various networks.

The World-Wide-Web or web refers to the total set of interlinked hypertext documents residing on hypertext-transfer protocol (HTTP) servers all around the world. Documents on the web, called pages or web pages, are written in hypertext mark-up language (HTML) identified by uniform-resource locators (URLs) that identify the particular machine and pathname by which a file can be accessed and transmitted from node to node to the end user using HTTP. HTML-based pages contain standard text as well as formatting codes that indicate how the page should be displayed. A web site is a related group of these documents and associated files, scripts, subprocedures, databases, etc. that are provided by an HTTP server coupled to one of the various networks.

Users of mobile-communication devices need an application program generally called a "browser" and a communication link to the Internet to access a web site. Browsers are software applications that locate, request, receive, and display content stored within a specific device coupled to the Internet. Popular browsers for laptop and desktop-computing devices are graphical browsers. Graphical browsers display graphics including text. Browsers for mobile-communication devices generally display text information, although more recent communication services provide some graphics and sound.

Web browsers also enable a user to navigate the Internet, i.e., view HTML files stored on a web-connected device, view data stored on another network, or access data stored on a user's computing device or the user's mobile-communication device. A user can navigate the Internet by entering a URL in an address-entry field provided by the browser or selecting a "link" embedded in a displayed representation of an HTML file. A user can navigate network-coupled devices by entering appropriate paths in the address-entry field. Once the user has found a folder or file-of-interest, the user can enter a command to view the contents of the folder or open the file-of-interest. When the file-of-interest is a HTML file, the browser displays the file like any other web page. Since mobile-communication devices often are not equipped to store and run robust applications, the representation of the downloaded or otherwise identified HTML file is often limited to text.

A user of a mobile-communication device can download a web page or access other information by locating an associated file stored on a device connected to the web. The user can then initiate a print job to create a hard copy of the web page. For example, existing PDAs generally enable printing from the PDA to a printer using a wireless link. However, methods for enabling mobile-communication devices to print a file are problematic.

First, limited storage space on the mobile-communication device hinders the ability of the device to efficiently print data-rich content. Second, wireless links can be surreptitiously intercepted. While data-encryption techniques can be applied to lessen the likelihood that information will be casually intercepted and misused, encryption and the subsequent decryption in the receiving printer exacerbate the inefficiencies of transferring data over a wireless link.

In addition to inefficiencies related to the bandwidth of the wireless link, printing a file from a mobile-communication device is problematic for additional reasons. First, conventional protocols for transferring data to a printer do not provide a mechanism to control printer operation. Consequently, the user of a mobile-communication device cannot set printer controls that alter operational characteristics of the printer. Second, conventional protocols do not provide a mechanism for the printer to notify the user regarding its present configuration i.e., paper jams, ink level, job completion, errors, etc.

Another problem concerns how to forward data from a mobile-communication device in a format that is recognizable by the specific printer. To print information from a mobile-communication device, the device must either store or locate a driver that controls the specific printer that the user would like to use. A driver is a software program that translates generic commands typically generated by one or more application programs into device-specific commands understood by the device.

Consequently, improved ways are needed to initiate, control, and provide printer-ready data to a designated printer from a mobile-communication device.

SUMMARY

An embodiment of a method for processing a printer-control command includes identifying when an encoded-uniform-resource-locator-based printer-control command is received, decoding the encoded-uniform-resource-locator to identify an intended printer function, and performing the intended printer function.

BRIEF DESCRIPTION OF THE DRAWINGS

An apparatus and a method for processing a mobile device generated printer-control command are illustrated by way of example and not limited by the implementations depicted in the following drawings. The components in the drawings are not necessarily to scale. Emphasis instead is placed upon clearly illustrating the principles of the present apparatus and method. Moreover, in the drawings, like reference numerals designate corresponding parts throughout the several views.

DETAILED DESCRIPTION

In an embodiment, among others, a mobile-communication device provides a mechanism that enables an operator to communicate with a host of devices via one or more wireless links. In various embodiments, any of a number of wireless-communication protocols can be used to generate an encoded printer-control command designated for a specific-printing device. The encoded printer-control command is included within a uniform-resource locator (URL) designated for the printing device. Printer-specific control commands are processed by the printing device. Printer-specific control commands set printer attributes, which alter the printer's operational characteristics, and include commands directing the printer to report on its present condition by generating a hard-copy summary or other printer-generated reports.

In the representative embodiments, the URL can include a reference to a print service communicatively coupled to the printing device. A print service is an HTTP addressable logical unit capable of performing a multitude of parallel tasks. For example, a print service can be preloaded with a set of drivers corresponding to each printing device coupled to a LAN where the print service is hosted. In one mode of operation, the drivers translate generic print commands generated by the mobile-communication device to printer-ready data that is used by the printer to generate a hard copy representation of information stored within the mobile-communication device. In another mode of operation, the print service generates a request for web accessible content. After the web-accessible content is received by the print service, the print service uses an appropriate driver to translate the content into printer-ready data that the print service forwards to the printer. In a third mode of operation, the print service locates, retrieves, images, and renders data stored in a network-coupled data store.

In this way, a mobile-communication device can direct and control a print device to print information stored in a variety of document types across a variety of locations. For example, the print service can be configured with a host of application software, thus enabling the print service to offload communication, imaging, and rendering tasks associated with printing *.doc, *.xls, *.pdf, *.jpg, *.html, etc.

Printer tasks of an indeterminate length include requests to print data accessible via a print service. These tasks have an indeterminate length (in time) once they are received and forwarded from a specific printer because the printer has no way of knowing the length of time it will take to locate, retrieve, image, and render or otherwise translate the requested document into printer-ready data. Printer tasks of an indeterminate length are monitored until completion of the designated task or until an error condition has been returned to the printer from the print service. An apparatus and a method for processing an encoded printer-control command having been generally described above, reference is now directed to the representative embodiments illustrated in the drawings.

Figure 1:
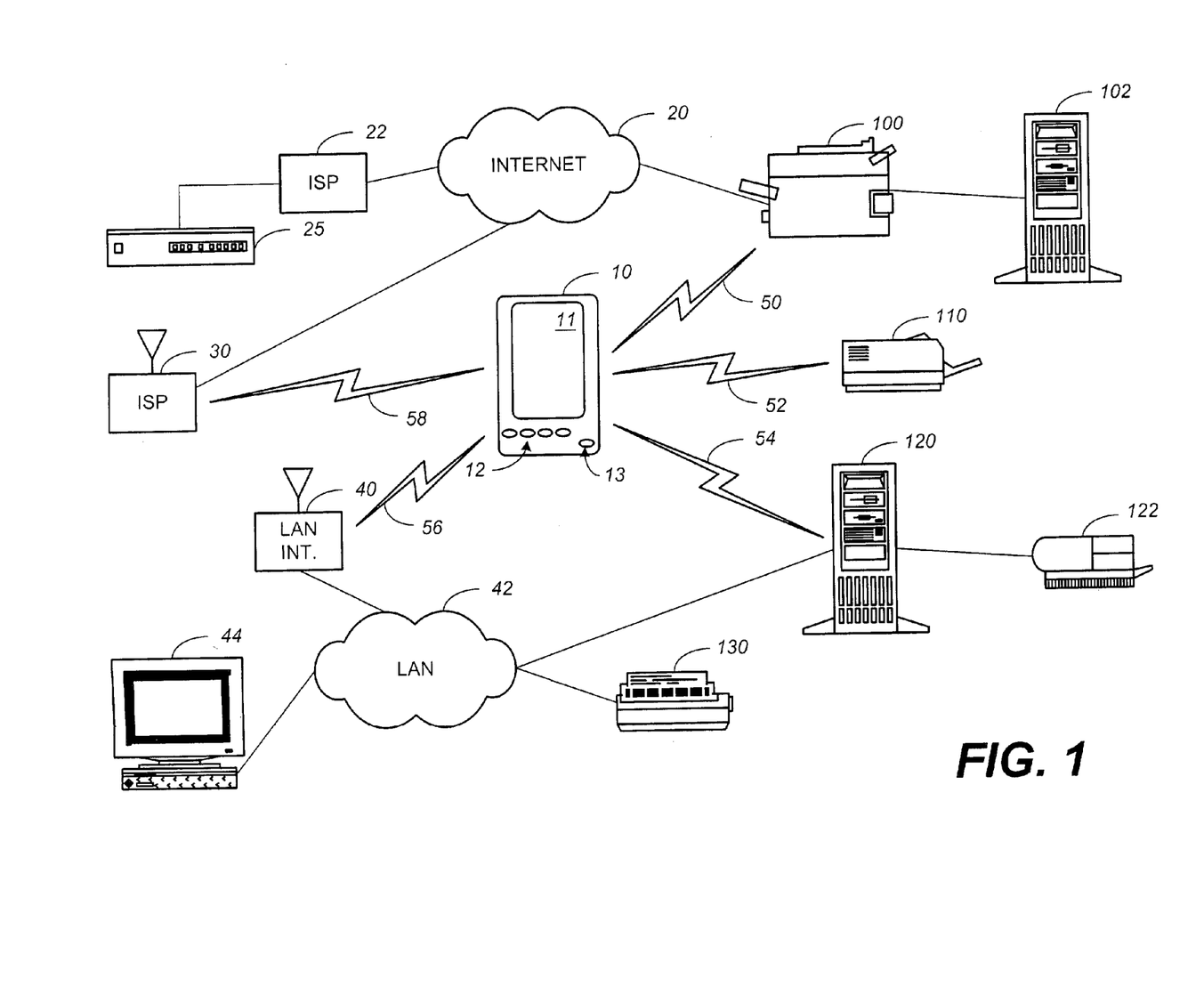
FIG. 1 is a schematic diagram illustrating an embodiment of a wireless network including wireless connectivity with a mobile-communication device.

FIG. 1 is a schematic diagram illustrating communication and printing options available to a mobile-communication device 10. In the example of FIG. 1, the mobile-communication device 10 is a personal-digital assistant (PDA). Alternatively, the mobile-communication device 10 can be a cellular phone, a pager, or any type of portable device configured with a wireless interface.

Mobile-communication device 10 includes display 11, function keys 12, and a data-transmit button 13. Display 11 presents one or more interactive graphical and/or textual interfaces or menus that are selected and operable via one or more of the function keys 12. Alternatively, display 11 can be a touch screen for receiving inputs from a user of the mobile-communication device 10. While in this embodiment a user of the mobile-communication device 10 navigates the menus and depresses data-transmit button 13 to make a print selection, other mechanisms for making a print selection via display 11 can be used. For example, a print icon can be integrated with display 11. As described below, the mobile-communication device 10 enables a user to control a communicatively coupled printer and direct a print service to command the printer to print content-rich data stored anywhere across a network. Content-rich data includes web pages, documents, photographs, etc. accessible via a network.

Mobile-communication device 10 communicates with one or more network coupled devices via wireless-communication links 50, 52, 54, 56, and 58. Wireless-communication links 50, 52, 54, 56, and 58 can be infrared (IR) or radio-frequency (RF) links capable of transferring an alphanumeric string in the form of a URL from mobile-communication device 10 to each of the receiving devices. A variety of wireless-communication interfaces and data-transfer protocols support the communication of alphanumeric information from a portable device such as mobile-communication device 10 and an appropriately configured receiving device. For example, infrared-data association protocol (IrDA), wireless fidelity (IEEE 802.11b wireless networking) or Wi-Fi, Bluetooth®, etc. each support wireless-data transfers. Bluetooth® is the registered trademark of Bluetooth SIG, Inc.

Bluetooth® is particularly useful for data transfers between mobile-communication device 10 and appropriately configured printers, computers, LAN interfaces, and Internet-service provider (ISP) wireless-access points. Bluetooth® uses a number of RF channels between 2.40 and 2.48 GHz to communicate data. Since Bluetooth® uses a RF transmission medium, communicating devices do not need to be in the line-of-sight (LOS) of each other's IR beam. Bluetooth® also frequency hops i.e., it changes frequencies over a thousand times a second using nearly eighty channels within the 2.40 and 2.48 GHz frequency range. Consequently, even though Bluetooth® shares this frequency range with cordless phones, baby monitors, and 802.11b wireless networks, data-transmission disruptions are negligible.

Perhaps the most significant feature of Bluetooth® technology that makes it well-suited for communicating with a remote device such as the mobile-communication device 10 is that Bluetooth®-enabled devices can find and establish a communication link with each other without the user having to initiate the link. When two Bluetooth®-enabled devices come within signal range of each other, they immediately begin a series of negotiations to determine if they have information for one another. If the negotiation session results in a determination that the devices have information for one another, the devices form a piconet or a personal-area network. Consequently a Bluetooth®-enabled mobile-communication device 10 can automatically establish communication links 50, 52 with Bluetooth®-enabled printers 100, 110. Furthermore, Bluetooth®-enabled devices rely on a set of rules or profiles for communicating particular types of data. Typical profiles, include a serial-port profile for communicating printer-ready data and otherwise connecting devices such as printers and scanners. Bluetooth® also includes an object-push profile for moving data between devices, a synchronization profile for PDA-synch operations, a facsimile profile, which allows a personal computer (PC) to use a Bluetooth®-enabled cellular phone as a facsimile modem.

While Bluetooth®-enabled devices have been described above in association with the schematic of FIG. 1, those of ordinary skill in the art will understand that wireless-data transfer protocols IrDA, 802.11(a), 802.11(b), etc., are also capable of establishing a communication link 50, 52, 54, 56, 58 capable of communicating a URL encoded with a printer-control command in accordance with the present apparatus and method.

As illustrated in FIG. 1, communication link 50 enables mobile-communication device 10 to communicate with printer 100. Printer 100 is further coupled to computer 102 and Internet 20. Internet 20 is communicatively coupled to ISP 22 and wireless Internet-access point 30. Consequently, communication link 50 enables a user of mobile-communication device 10 to locate, retrieve, and/or interact with data and applications stored in web server 25 which is coupled to the Internet 20 via ISP 22. Communication link 58 is wirelessly coupled to wireless Internet-access point 30 thus providing an alternative path for mobile-communication device 10 to access Internet 20 and Internet coupled devices.

Communication link 52 wirelessly couples mobile-communication device 10 to printer 110. Communication link 54 wirelessly couples mobile-communication device 10 to computer 120. Computer 120 is further coupled to printer 122 and LAN 42. Consequently, computer 120 is communicatively coupled to printer 130 and workstation 44 via LAN 42. Communication link 56 is wirelessly coupled to wireless LAN-access point 40 thus providing an alternative path for mobile-communication device 10 to access LAN 42 and LAN-coupled devices.

Printer 100 is a high-speed multiple source printer. Printer 110 is a laser printer. Printer 122 is an inkjet printer. Printer 130 is an impact printer. Mobile-communication device 10 can initiate and transmit a print command via communication link 50 to printer 100. When mobile-communication device 10 includes a printer driver compatible with printer 100, printer-ready data can be communicated to and printed by printer 100. Mobile-communication device 10 can direct a print task to printer 110 in a similar fashion.

Mobile-communication device 10 can direct a print task to printer 122 by transferring print data to computer 120. The print task can include a reference to content-rich data stored on computer 120 or workstation 44. When LAN 42 is coupled to the Internet 20 (LAN 42 is not coupled to Internet 20 in FIG. 1), computer 120 can download content-rich data from web server 25 and/or computer 102, when printer 100 is coupled to Internet 20. Computer 120 accesses the referenced content-rich data and forwards the data to printer 122 for printing.

Mobile-communication device 10 can direct a print task to printer 130 by transferring print data to computer 120. Computer 120 forwards the data via LAN 42 to printer 130. The print task can include a reference to content-rich data stored on computer 120 or workstation 44. When LAN 42 is coupled to the Internet 20, computer 120 can download content-rich data from web server 25 and/or computer 102. Computer 120 accesses the referenced content-rich data and forwards the data to printer 130 via LAN 42 for printing.

Printers 100, 110, 122, 130 can be located in physical proximity with mobile-communication device 10 or can be in a remote location, even in a different country, from mobile-communication device 10. For example, any of the printers 100, 110, 122, 130 can be located in a kiosk in a public place such as an airport. Alternatively, any of the printers 100, 110, 122, 130 can be located within a place of business, or within a user's home. Printers 100, 110, 122, 130 can be, for example, high-volume multiple function printers, laser printers, inkjet printers, all-in-one office devices with print capability, inkjet printers, and so on.

In an embodiment, use of data-transmit button 13 initiates a seamless integration of these (as well as future) printing models that can be applied to any content delivered to and/or addressable by mobile-communication device 10. Content includes a full range of printable material from word-processing, spreadsheet, and other office applications, as well as high-resolution photographs, web pages, web-accessible coupons, etc.

Preferably, although not required, various printing technologies are integrated into a module that resides within and is accessible to a browser on mobile-communication device 10 and is accessible by a browser operable on the mobile-communication device 10. For example, if mobile-communication device 10 is a PocketPC™, available commercially from the Hewlett-Packard Company, the module is implemented as an ActiveX® control for Pocket-Internet Explorer. ActiveX® is the registered trademark of Microsoft Corporation, Redmond Wash., U.S.A.

If mobile-communication device 10 is a Palm® device, available from Palm, Inc., the module is implemented as a pod for the AvantGo® browser. AvantGo® is the registered trademark of AvantGo, Inc. San Mateo, Calif., U.S.A. If mobile-communication device 10 is a wireless Palm®, such as the Palm VII™, available from Palm, Inc., the module is implemented as a "*.prc" application for the Web-Clipper browser. Palm® is the registered trademark of Palm, Inc., Santa Clara, Calif., U.S.A.

Figure 2:
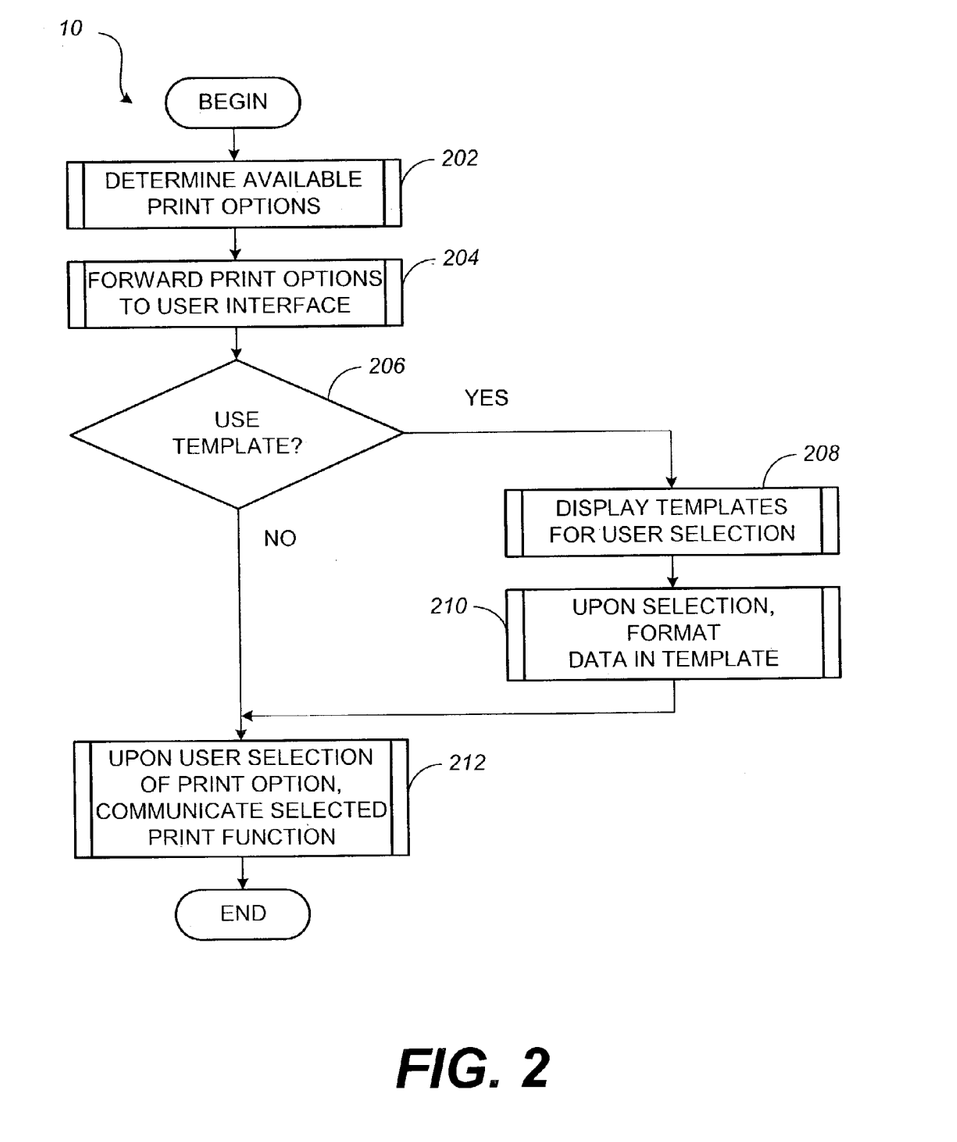
FIG. 2 is a flow diagram that illustrates an embodiment of a method for printing from the mobile-communication device of FIG. 1.

FIG. 2 is a flow diagram illustrating operation of the print module upon selection of data-transmit button 13. In block 202, the mobile-communication device 10 determines available print options. Available print options can include direct-data transfers using an IR-communication link, a Bluetooth® link, etc. Other available print options can include indirect-data communications via a cellular-communication service. As indicated in block 204, once, the mobile-communication device 10 has determined the available print options, the device forwards an indication of the options to a user interface, such as display 11. Next, a determination is made as indicated in determination block 206 whether to use a print-selection interface template.

When it is determined that a print-selection interface template is desired as indicated by the flow-control arrow labeled, "YES" exiting determination block 206, mobile-communication device 10 displays the templates for user selection as shown in block 208. Thereafter, as indicated in block 210, upon selection of a template by the a user of the mobile-communication device 10, data is formatted and prepared for subsequent transmission in accordance with a selected print mechanism. Otherwise, when it is not desired to use a print-selection template to assist in configuring display 11, for example, when a user of the mobile-communication device 10 has installed components that support only a single-data transmission mechanism, data is transmitted in accordance with a default-transmission mechanism as indicated in block 212.

Figure 3:
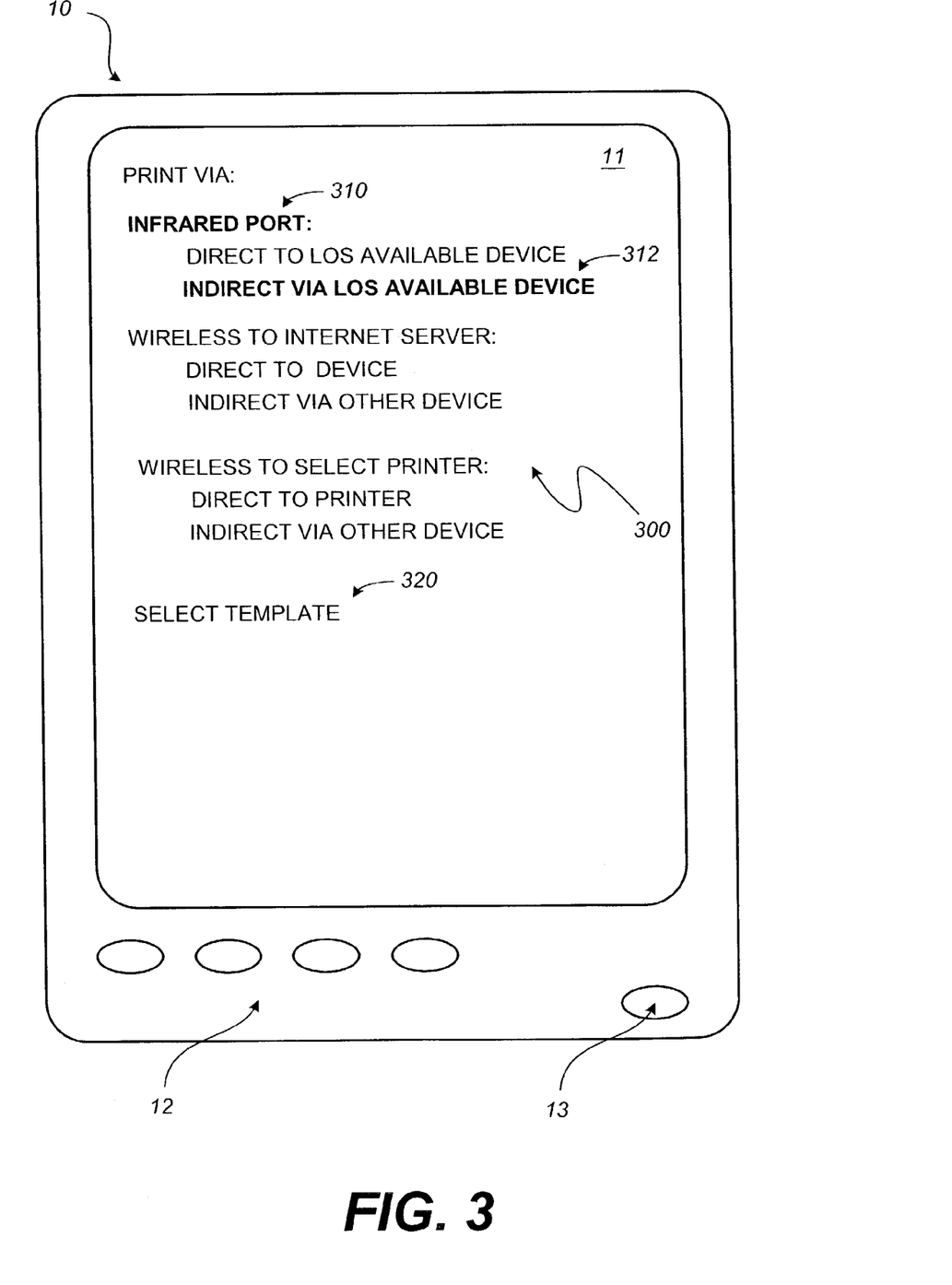
FIG. 3 is a diagram illustrating an embodiment of print options selectable from the mobile-communication device of FIG. 1.

FIG. 3 illustrates an embodiment of display 11 resulting from block 204. The displayed print options 300 include printing from an IR port 310 as well as a wireless port to an Internet-access point and via a wireless port to a select printer. Each of the available print options has two-sub options. A direct printing sub-option indicates that the mobile-communication device 10 communicates directly with a specific printer. The indirect printing sub-option indicates that the mobile-communication device 10 forwards one or more references to a computer, a wireless-network access point or some other device communicatively coupled to a designated printer. The references include information identifying the designated printer. The references may also include information identifying one or more files, web pages, etc. that the user desires to print.

The user of the mobile-communication device 10 makes a print options choice in accordance with present conditions. The choice can depend, for example, on the capabilities of the mobile-communication device 10, the availability of various printing devices, the availability of a wireless service, etc.

As indicated by the bold text, a user has selected indirect printing via a LOS available communication device 312. FIG. 3 also illustrates that display 11 provides an option for a user of the mobile-communication device 10 to select a print-selection template 320. A print-selection template presents a graphic and/or pre-defined interface layout residing on the mobile-communication device 10. Information stored on the mobile-communication device 10 such as contacts, appointments, notes, to-do lists, and so on can be formatted and printed using the templates with the resulting output being much higher in quality than with simple formatting.

Figure 4:
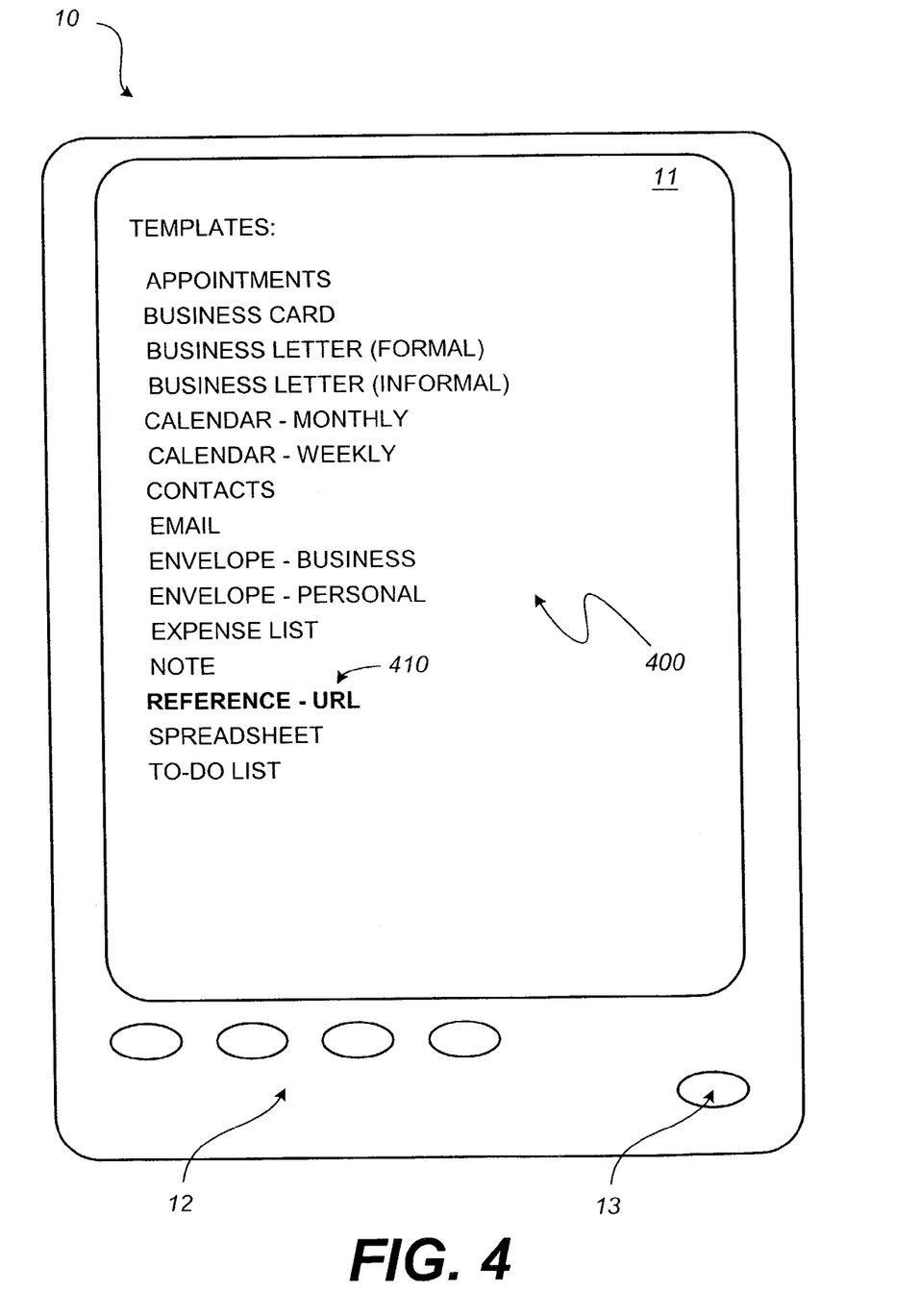
FIG. 4 is a diagram illustrating an embodiment of a set of print templates including a uniform-resource-locator-template selectable from the mobile-communication device of FIG. 1.
Figure 5:
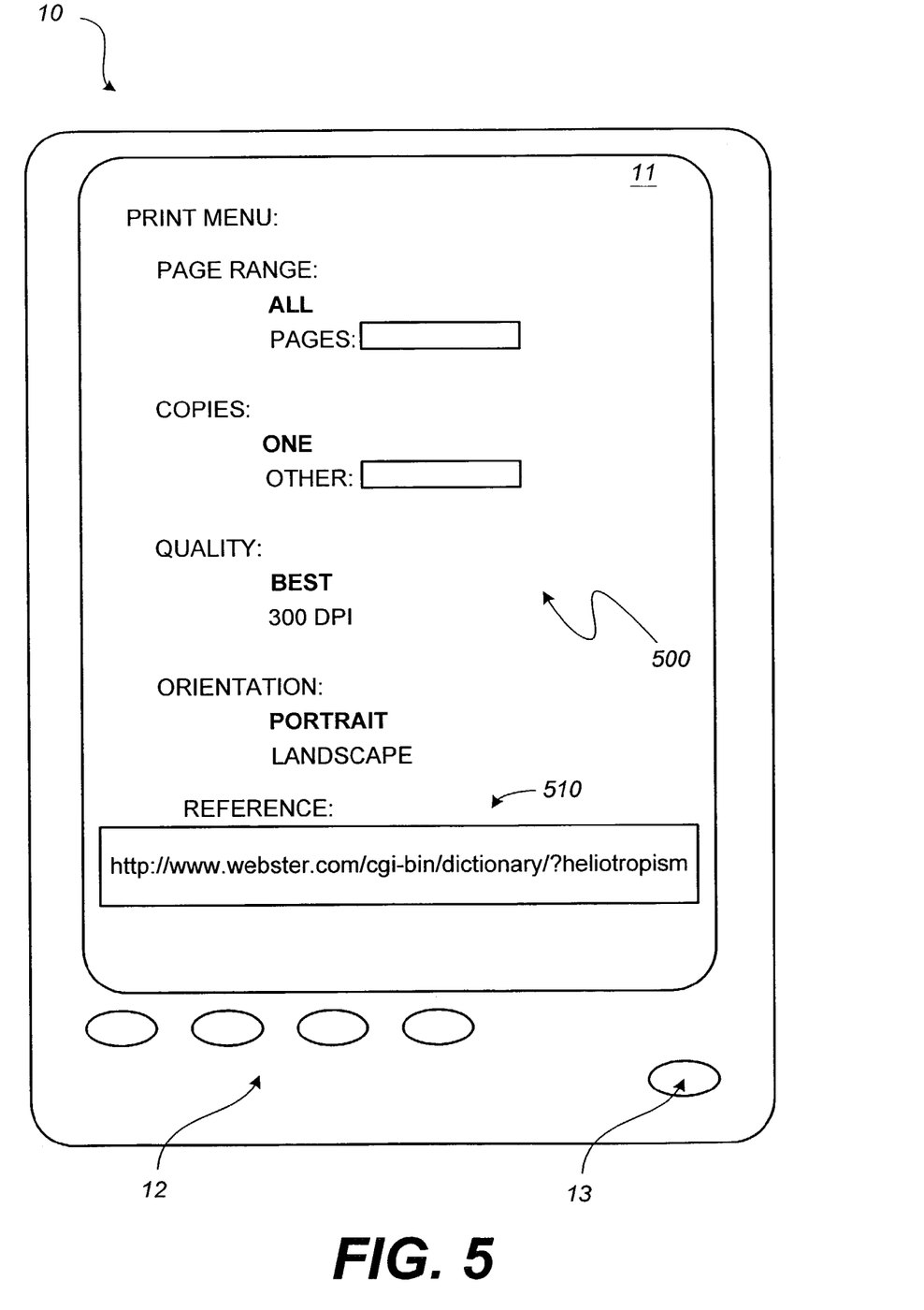
FIG. 5 is a diagram illustrating an embodiment of a print menu selectable from the mobile-communication device of FIG. 1.

FIG. 4 illustrates the result of block 208 in the flow diagram of FIG. 2. A plurality of print templates 400 are presented to the user via display 11. As indicated in FIG. 4, one of the available print templates is a reference-URL template 410. Upon selecting the reference-URL template 410, a user of the mobile-communication device 10 is presented the user interface of FIG. 5. As shown in FIG. 5, the user is presented with an interface that includes a print-options menu 500 complete with a URL-reference input field 510 for identifying the location of content that the user desires to print. As explained above, content includes files stored on a computer, such as photographs, spreadsheets, presentations, documents, web pages, etc. The example illustrated in FIG. 5 references a web page. More specifically, the URL-reference input field 510 includes an alphanumeric string that directs the mobile-communication device 10 to pull the definition of the word "heliotropism." from www.webster.com.

Figure 6:
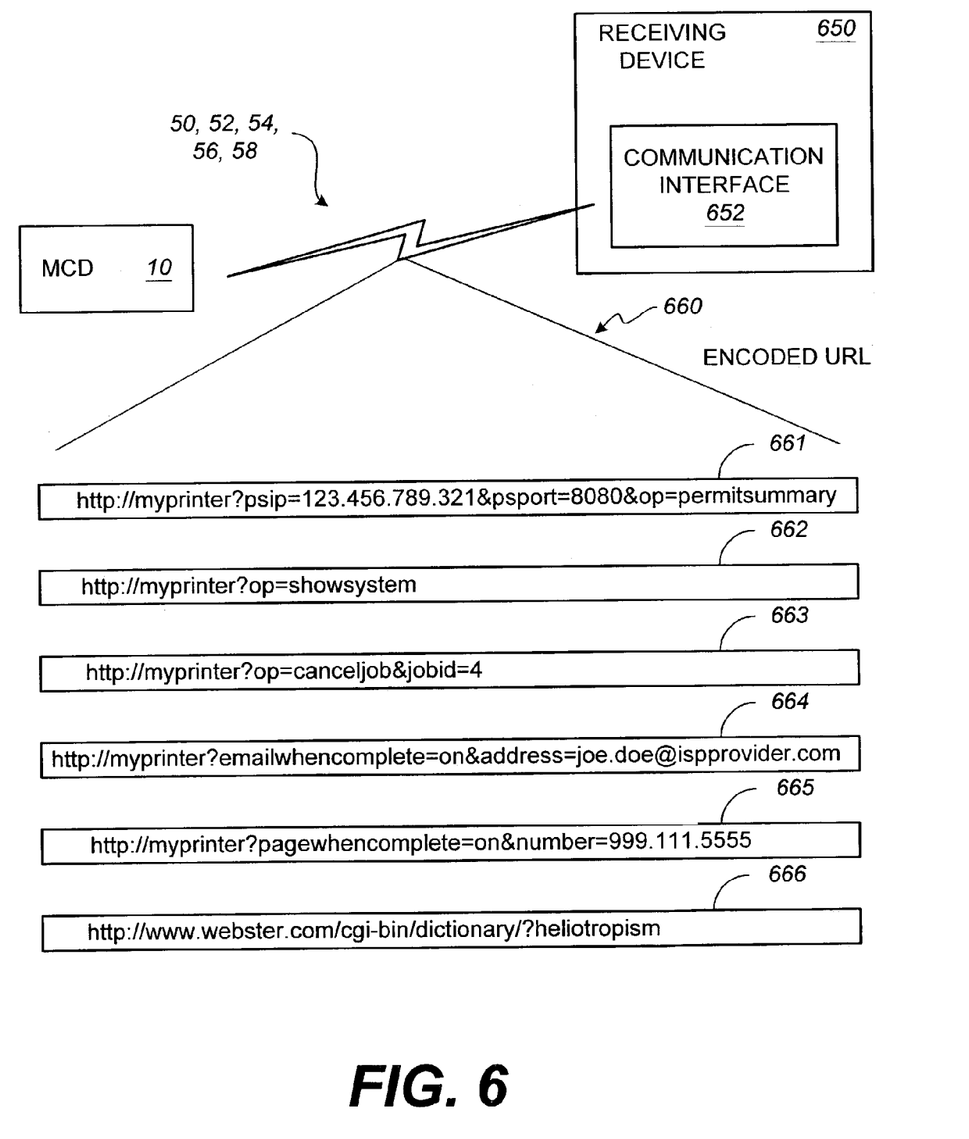
FIG. 6 is a diagram illustrating the transfer of embodiments of encoded printer-control commands from the mobile-communication device of FIG. 1.

FIG. 6 presents a block diagram illustrating data transfers with an encoded URL 660. Upon user selection of data-transfer button 13, mobile-communication device 10 generates one or more encoded URLs 660 that are transmitted in accordance with the user selected and/or the default-data transmission mechanism via one or more communication links 50, 52, 54, 56, 58. Communication links 50, 52, 54, 56, and 58 can be enabled using Bluetooth® and/or other wireless-communication protocols. As explained above, Bluetooth®-enabled devices are configured to automatically establish communication links 50, 52, 54, 56, 58 when mobile-communication device 10 is within signal range of the associated network-coupled device. One such wireless-communication protocol, the object-exchange (OBEX) protocol is optimized for ad-hoc wireless links and can be used to exchange various objects such as files, pictures, calendar entries (vCal), and business cards (vCard).

The encoded URLs 660 are received in a proximally located receiving device 650 configured with a communication interface 652 compatible with the user selected and/or the default data-transmission mechanism.

As illustrated in FIG. 6, an encoded URL 661 contains a printer identifier. Encoded URL 661 further includes a print-service IP address along with the printer identifier. Encoded URL 661 directs "my printer," the designated printer, to offload some portion of the print task to a print service located at Internet protocol address 123.456.789.321. Encoded URL 661 further directs the print service to use port 8080 and directs "my printer" to perform the operation "permit summary." Encoded URL 662 directs "my printer" to perform the operation "show system." Encoded URL 663 directs "my printer" to cancel a pending print job. Encoded URL 664 directs "my printer" to generate an email message addressed to "joe.doe@ispprovider.com" upon completion of the directed print task. Encoded URL 665 enables a pager message upon completion of the present print task and further supplies a designated telephone number identifying a destination for the message. Encoded URL 666 directs the print service to access a web page from "www.webster.com" that contains the definition of the word "heliotropism."

Note that encoded URL 664 and encoded URL 665 will be operational when the designated printer i.e., "my printer" is configured with an email interface and a pager interface. In other embodiments, the email interface and the pager interface can be implemented in one or more software modules associated with a print service. In these alternative embodiments, the associated encoded URL will contain an identifier of the print service in addition to an identifier for the designated printer.

Other possible printer-control commands are limited only by the capabilities of the designated printer. Printer functions and selections that can be manipulated remotely by software or directly via printer interfaces can be selectively modified by the mobile-communication device 10. The examples illustrated in FIG. 6 are intended to control print tasks and printer attributes associated with a printer named "my printer." For the mobile-communication device generated URLs to operate as intended, no other device coupled to receiving device 650 should share the same name.

Figure 7:
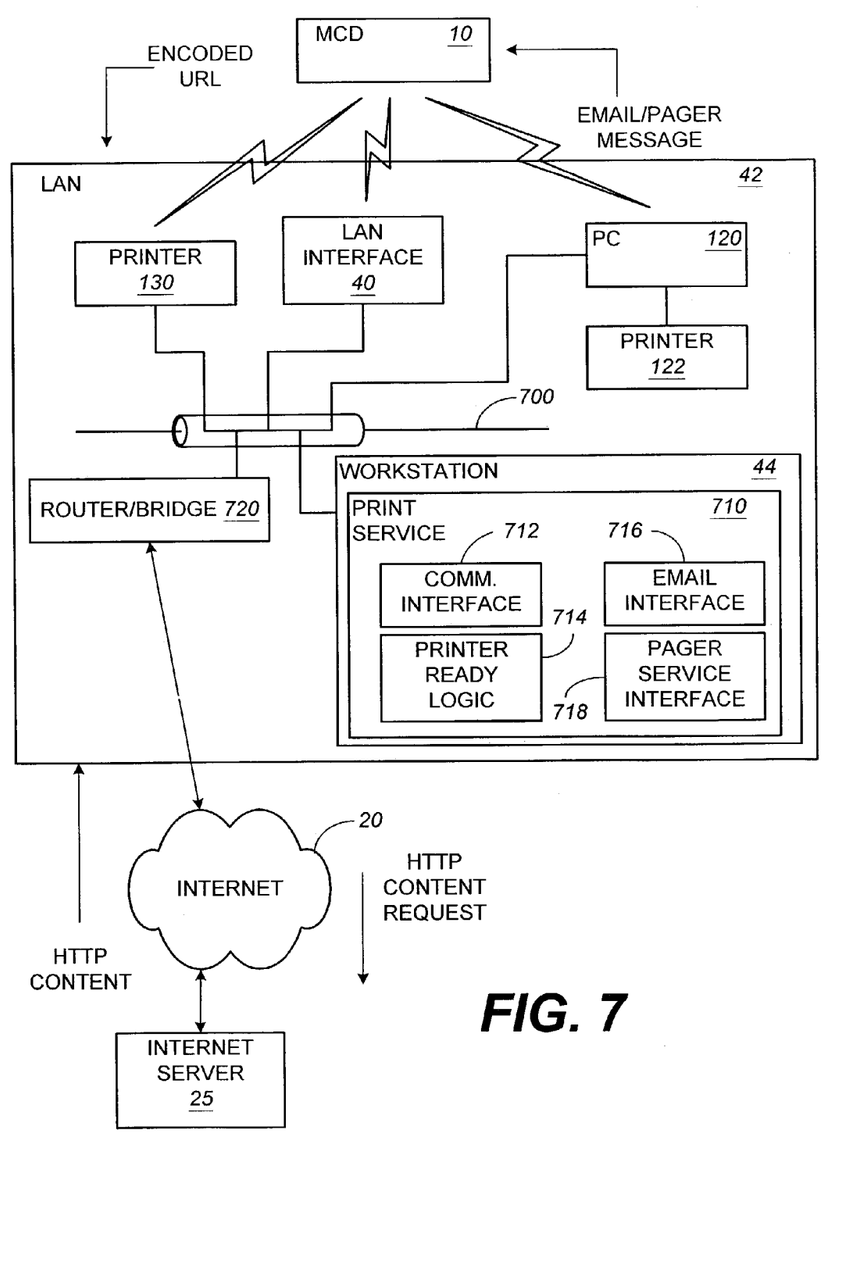
FIG. 7 is a functional block diagram illustrating operation of the mobile-communication device with an embodiment of the local-area network (LAN) of FIG. 1.

FIG. 7 is a functional block diagram illustrating the processing of printer tasks directed by encoded URLs. In the example shown in FIG. 7, mobile-communication device 10 forwards encoded URLs to printer 130, or some other device configured with a wireless interface, such as LAN interface 40 and/or personal computer (PC) 120. Printer 130, LAN interface 40, PC 120, router/bridge 720, and workstation 44 are communicatively coupled by LAN backbone 700. LAN backbone 700 can be any of a number of different LAN backbones including ethernet, a wireless LAN, etc. As illustrated in FIG. 7, workstation 44 is configured with a print service 710.

Print service 710 is a collection of logic modules each containing a plurality of executable instructions for performing specific tasks. For example, print service 710 is configured with communication interface 712, printer-ready logic 714, email interface 716, and pager interface 718. Communication interface 712 includes logic configured to locate, access, and download web content from one or more Internet-coupled servers such as Internet server 25. As is further shown in FIG. 7, communication interface 712 receives requests for web-based content via encoded URLs generated by mobile-communication device 10. In the schematic of FIG. 7, one of the printer 130, LAN interface 40 or PC 120 receives the encoded URL(s). When printer 130 receives the encoded URL(s), printer 130 strips off printer commands intended for its own consumption, and initiates a monitoring process for tasks of indeterminate length (e.g., a request to retrieve and print web-content) before forwarding any remaining encoded URL(s) via LAN backbone 700 to print service 710 within workstation 44. Communication interface 712 forwards the request to the appropriate Internet server 25. After print service 710 establishes a communication session with Internet server 25, print service 710 pulls the requested content in accordance with HTTP. HTTP content is received by printer-ready logic 714 which is configured to image, render, and translate the HTTP content for printing on either printer 130 or printer 122 as instructed by the received encoded URL.

When an encoded URL directs the print service 710 to forward information upon completion of a task or upon detection of an error condition generated by the designated printer or the print service 710, email interface 716 receives the information and constructs an appropriate response which it forwards to an email service for ultimate delivery to an address encoded within the received URL(s). Similarly, when an encoded URL directs the print service 710 to forward information upon completion of a task or upon detection of an error condition generated by the designated printer or the print service 710, pager-service interface 718 receives the information and constructs an appropriate response which it forwards to a pager service for ultimate delivery to the mobile-communication device 10 or a pager identified in the encoded URL. It will be understood by those skilled in the art that the embodiment illustrated in FIG. 7 is an example of a print service 710 that hosts an email interface 716 and a pager-service interface 718. As described above, one or both of these interfaces can be housed in the printer and/or on other computing devices coupled to LAN 42.

When the mobile-communication device 10 includes email and pager modules, the email and/or pager messages can be retrieved by a user of the mobile-communication device 10. It should be further understood that an operator of the mobile-communication device 10 can instruct print service 710 or some other email interface host to forward email messages to multiple email accounts. Furthermore, encoded URLs can direct print service 710 or some other pager-service interface host to generate and forward pager messages to a number of different paging devices via a number of different paging services located within proximity and broadcast range to the designated pager(s).

Figure 8:
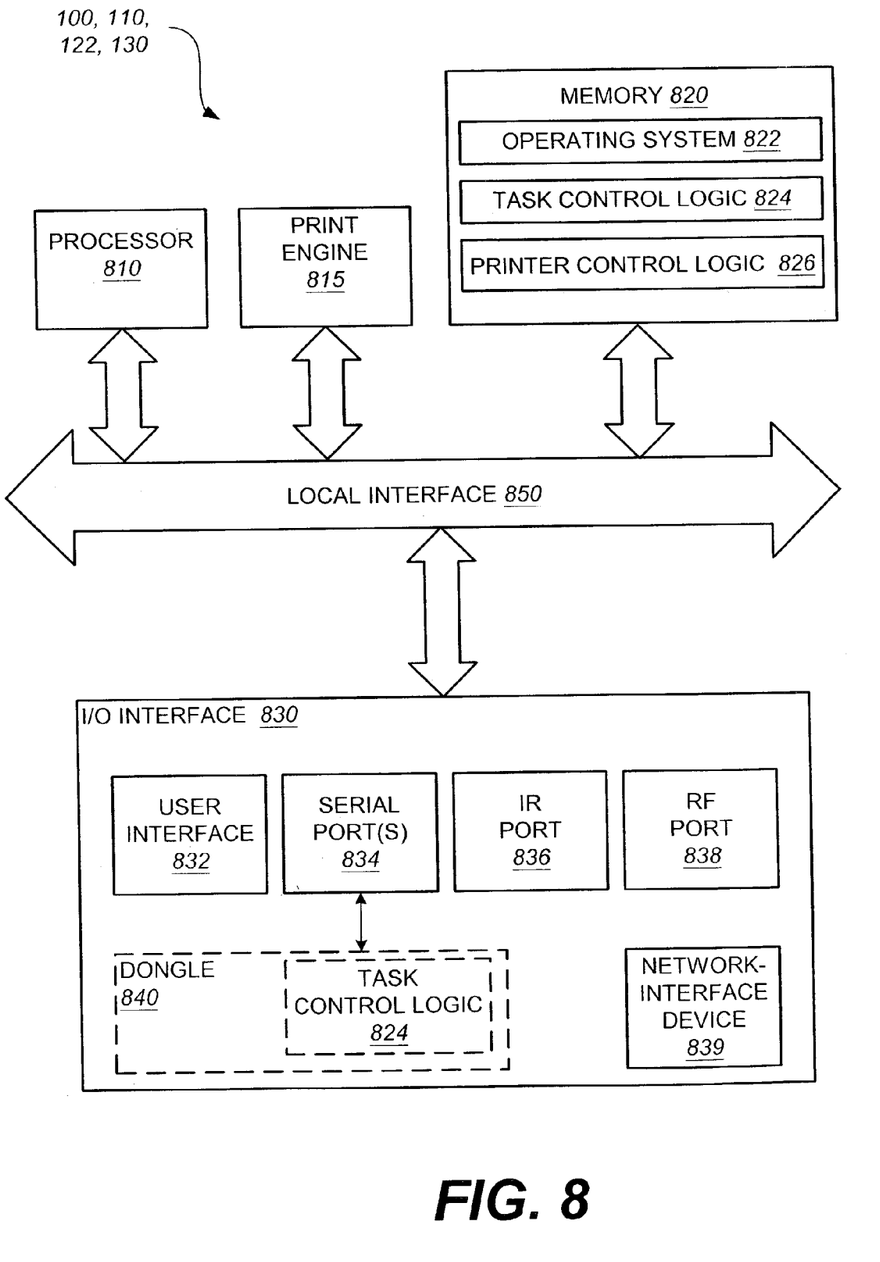
FIG. 8 is a functional block diagram illustrating an embodiment of a printer architecture.

FIG. 8 is a block diagram illustrating an embodiment of a printer architecture that can be shared by printers 100, 110, 122, 130. Generally, printers 100, 110, 122, 130 includes a processor 810, print engine 815, memory 820, and an input/output (I/O) interface 830 that are communicatively coupled via local interface 850.

Local interface 850 can be, for example but not limited to, one or more buses or other wired or wireless connections, as is known in the art or may be later developed. Local interface 850 may have additional elements, which are omitted for simplicity, such as controllers, buffers (caches), drivers, etc. to enable communications. Further, local interface 850 may include address, control, and/or data connections to enable appropriate communications among the aforementioned components of the printers 100, 110, 122, 130.

In the embodiment of FIG. 8, the processor 810 is a hardware device for processing executable logic (e.g., a computer program) that can be stored in memory 820. The processor 810 can be any custom-made or commercially-available processor, a central-processing unit (CPU) or an auxiliary processor among several processors associated with printers 100, 110, 122, 130 and a semiconductor-based microprocessor (in the form of a microchip). Print engine 815 includes hardware and firmware configured to apply one or print media to a hard-copy source.

The memory 820 can include any one or combination of volatile memory elements e.g., random-access memory (RAM), such as dynamic-RAM or DRAM, static-RAM or SRAM, etc. and nonvolatile-memory elements e.g., read-only memory (ROM), EPROM, EEPROM, etc. Moreover, the memory 820 may incorporate other types of storage media now known or later developed. Note that the memory 820 can have a distributed architecture, where various components are situated remote from one another, but accessible by processor 810.

The executable logic in memory 820 may include one or more separate programs, each of which comprises an ordered listing of executable instructions for implementing logical functions. In the example of FIG. 8, the software in the memory 820 includes operating system 822, task-control logic 824, and printer-control logic 826.

Operating system 822 preferably controls the execution of task-control logic 824 and printer-control logic 826 and provides task scheduling, input-output control via I/O interface 830, memory management, and communication control and related services.

In an embodiment, task-control logic 824 is one or more source programs, executable programs (object code), scripts, or other collections each comprising a set of instructions to be performed. Printer-control logic 826 is one or more source programs, executable programs, scripts, or other collections comprising a set of instructions to be performed. It will be well understood by one skilled in the art, after having become familiar with the teachings of the printer and method for processing an encoded URL that task-control logic 824 and printer-control logic 826 may be written in a number of programming languages now known or later developed.

I/O interface 830 includes a user interface 832 which may include functional pushbuttons, a touch-activated screen, interactive-pointing devices, voice-activated interfaces, or other operator-machine interfaces (omitted for simplicity of illustration) now known or later developed. Serial ports 834 may include a parallel-printing interface, a universal-serial bus (USB) interface, etc. To directly communicate with mobile-communication device 10, printers 100, 110, 122, 130 are configured with IR port 836 and RF port 838. As previously described IR port 836 and RF port 838 can be configured to support various different wireless-communication protocols compatible with mobile-communication device 10. Network-interface device 839 is configured to support LAN/WAN communications.

As further illustrated in FIG. 8, task-control logic 824 can be configured in a dongle 840 coupled to one of the serial ports 834. In this way, previously owned and printers already in the marketplace can be configured to enable localized job control and offload printing tasks directed by a mobile-communication device 10 or other devices via an encoded URL.

Those skilled in the art will understand that task-control logic 824 and printer-control logic 826 can be implemented in hardware, software, firmware, or combinations thereof. In an embodiment, task-control logic 824 and printer-control logic 826 are implemented using a combination of hardware and software or firmware that is stored in memory and executed by a suitable instruction-execution system. If implemented solely in hardware, as in an alternative embodiment, task-control logic 824 and printer-control logic 826 can be implemented with any or a combination of technologies which are well-known in the art (e.g., discrete-logic circuits, application specific integrated circuits (ASICs), programmable-gate arrays (PGAs), field programmable gate arrays (FPGAs), etc.), and/or later developed technologies.

In an embodiment, the functions of the task-control logic 824 and the printer-control logic 826 are implemented in a combination of software and data executed and stored within printer 100, 110, 122, and 130. It should be noted, however, that these instruction units may vary but are not dependent upon the nature of the underlying printer architecture.

Figure 9:
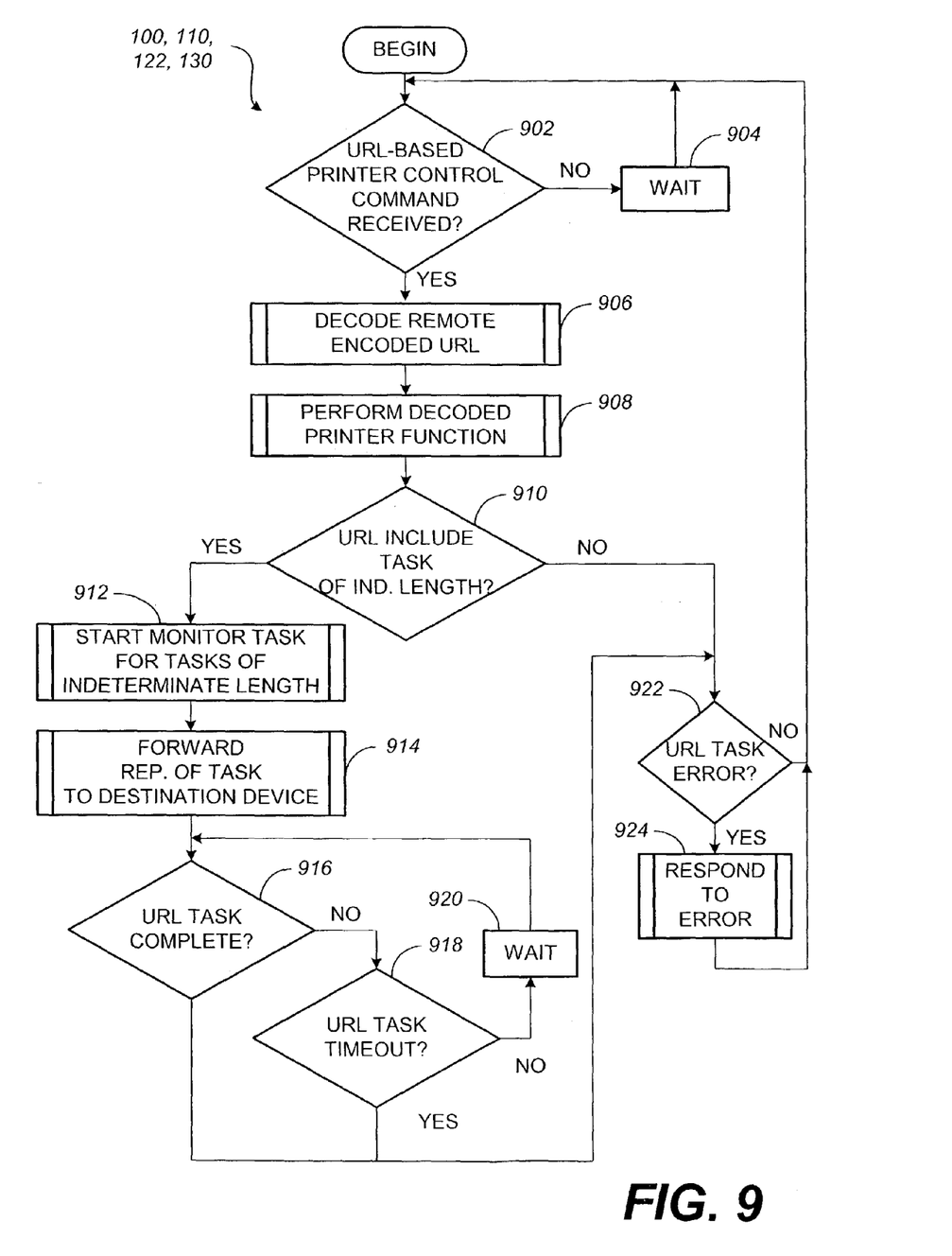
FIG. 9 is a flow diagram that illustrates an embodiment of a method for processing a uniform-resource-locator-based print task that can be implemented using the printer architecture of FIG. 8.

Reference is now directed to FIG. 9, which presents an embodiment of a method for processing a URL-based print task that can be implemented using the printer architecture of FIG. 8. As shown in decision logic 902 of FIG. 9, task-control logic 824 begins by making a determination if the associated printer has received a URL-based printer-control command. When the printer has not received an encoded URL as shown by the flow-control arrow labeled "NO" exiting decision logic 902, the task-control logic 824 waits for subsequent data as indicated in block 904 before repeating decision logic 902.

Otherwise, when the printer receives an encoded URL as indicated by the flow-control arrow labeled "YES" exiting decision logic 902, the task-control logic decodes the remote-encoded URL as indicated in block 906. In block 908 the printer performs the decoded printer function. Performing the decoding printer function can include setting a printer-specific print parameter such as resolution, color, source tray, printing a status summary, etc. Generally, these types of printer functions will be processed by print engine 815 under the direction of printer-control logic 826. Next, the printer is configured to perform decision logic 910 where it is determined if the decoded URL contains a printer task of indeterminate length suited for a device other than the printer. Tasks of indeterminate length include requests for web-based content such as but not limited to web pages, photographs, documents, etc.

When it is determined that the encoded URL contains a printer-control command with a task of indeterminate length as indicated by the flow-control arrow labeled, "YES" exiting decision logic 910, task-control logic 824 within the printer starts a monitor task as indicated in block 912. Next, the task-control logic 824 forwards a representation of the task to a designated destination device as shown in block 914. The designated destination device can be a print-service communicatively coupled to the printer and/or an Internet-coupled server when the printer is coupled to the Internet. Next, the task-control logic performs decision logic 916 to determine if the destination device has completed the assigned task.

When the task has been successfully completed, processing continues with decision logic 922. When the task has not completed successfully, as indicated by the flow-control arrow exiting decision logic 916 labeled, "NO," task-control logic 824 checks if the task has timed out. A task, times out when the task has exceeded a programmable threshold corresponding to the time the designated task should have been completed by the destination device. When the task has not timed out, as indicated by the flow-control arrow labeled "NO" exiting decision logic 918, task-control logic 824 is programmed to wait a predetermined amount of time before returning to decision logic 916.

Otherwise, when the result of decision logic 910 indicates that the encoded URL did not contain a task of indeterminate length as illustrated by the flow-control arrow labeled, "NO" exiting decision logic 910 processing continues with decision logic 922.

In decision logic 922, the task-control logic determines if it has received an indication of a URL-task error. A URL-task error can be generated by the destination device and/or by the designated printer. When the result of decision logic 922 is negative, i.e., no task error is indicated, processing returns to decision logic 902. Otherwise, when a task error has been identified, task-control logic 824 responds to the error as indicated in block 924.

Any process descriptions or blocks in the flow diagrams presented in FIGS. 2 and 9 should be understood to represent modules, segments, or portions of code or logic, which include one or more executable instructions for implementing specific logical functions or blocks in the associated process. Alternate implementations are included within the scope of the present apparatus and method in which functions may be executed out of order from that shown or discussed, including substantially concurrently or in reverse order, depending on the functionality involved, as would be understood by those reasonably skilled in the art after having become familiar with the teachings of the present apparatus and method.

Figure 10:
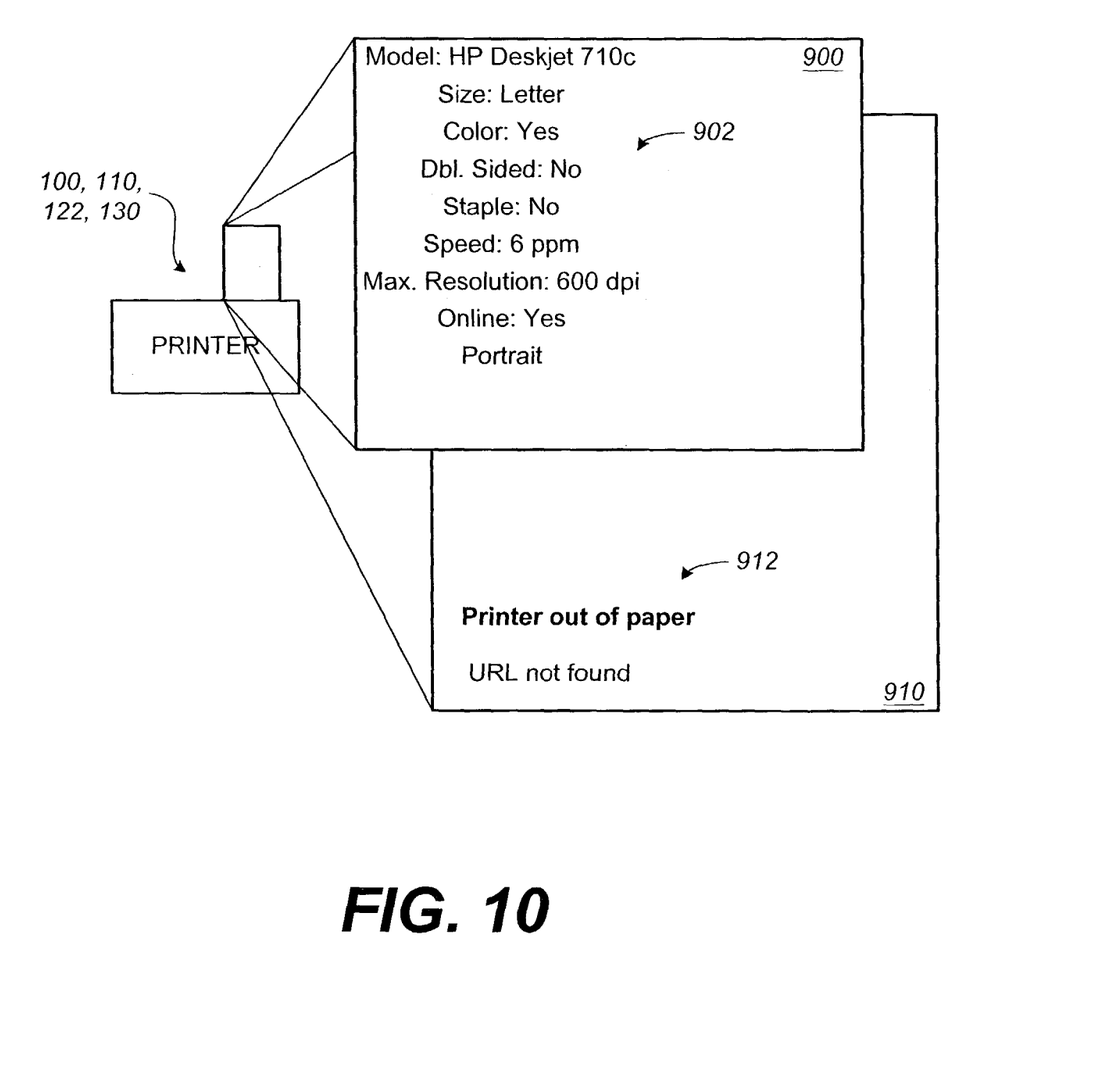
FIG. 10 is a diagram illustrating embodiments of a printer-status summary and a printer-task error condition on a printed page generated in response to one or more encoded printer-control commands.

FIG. 10 is a diagram illustrating a printer status summary and a printer-task error condition on a printed page generated in response to one or more encoded printer-control commands. As shown in FIG. 10, printers 100, 110, 122, 130 are configured to generate a printer-status summary 900 that includes one or more printer-operational parameters 910. Alternatively, printers 100, 110, 122, 130 are configured to generate a hard-copy representation 910 that includes one or more error conditions 912 reported by the respective printer and/or a print service 710. In this way, a communicatively coupled printer can be selectively controlled by a mobile-communication device 10 to provide a hard-copy representation of printer-status information and/or error conditions associated with a printer task. In these examples the printer is used as a mechanism to provide informational feedback to a user of the mobile-communication device 10.

We claim:

1. A method for processing a printer-control command, comprising:
   identifying when an encoded uniform-resource locator based printer-control command is received;
   decoding the encoded uniform-resource locator to identify a printer function;
   performing the printer; and
   when the printer function includes a task of indeterminate length, starting a monitor task and forwarding a representation of the task of indeterminate length to a destination device.

2. The method of claim 1, wherein decoding comprises identifying a mobile-communication device that generated the encoded uniform-resource locator.

3. The method of claim 1, wherein performing the printer function comprises modifying a printer parameter.

4. The method of claim 1, wherein performing the printer function comprises generating a hard-copy representation of a present operational status.

5. The method of claim 1, wherein decoding comprises identifying an email address.

6. The method of claim 1, wherein decoding comprises identifying a telephone number.

7. The method of claim 1, wherein forwarding a representation comprises sending the task of indeterminate length to a print service.

8. The method of claim 1, further comprising:
   checking for an error condition reported by the destination device.

9. The method of claim 8, further comprising:
   responding to an error condition.

10. The method of claim 9, wherein responding comprises printing a page including a representation of the error condition.

11. The method of claim 9, wherein responding comprises sending an email message including a representation of the error condition.

12. The method of claim 9, wherein responding comprises sending a pager message including a representation of the error condition.

* * * * *

UNITED STATES PATENT AND TRADEMARK OFFICE
CERTIFICATE OF CORRECTION

PATENT NO. : 7,199,895 B2
APPLICATION NO. : 10/349640
DATED : April 3, 2007
INVENTOR(S) : Dan L. Collier et al.

It is certified that error appears in the above-identified patent and that said Letters Patent is hereby corrected as shown below:

In column 13, line 14, in Claim 1, after "printer" insert -- function --.

Signed and Sealed this

Ninth Day of September, 2008

JON W. DUDAS
*Director of the United States Patent and Trademark Office*